July 7, 1970 HARUHISA FURUISHI ET AL 3,519,842

VOLTAGE SWITCHING DEVICE

Filed Dec. 13, 1965 8 Sheets-Sheet 1

INVENTORS

Haruhisa Furuishi

Yoneji Koyama

BY

Stevens, Davis, Miller & Mosher

ATTORNEYS

VOLTAGE SWITCHING DEVICE

Filed Dec. 13, 1965 8 Sheets-Sheet 2

INVENTORS
Haruhisa Furuishi
Yoneji Koyama
BY Stevens, Davis, Miller & Mosher
ATTORNEYS

VOLTAGE SWITCHING DEVICE

Filed Dec. 13, 1965 8 Sheets-Sheet 3

INVENTORS
Haruhisa Furuishi
Yoneji Koyama
BY Stevens, Davis, Miller & Mosher
ATTORNEYS July 7, 1970 HARUHISA FURUISHI ET AL 3,519,842

VOLTAGE SWITCHING DEVICE

Filed Dec. 13, 1965 8 Sheets-Sheet 4

INVENTORS

Haruhisa Furuishi

Yoneji Koyama

BY Stevens, Davis, Miller & Mosher

ATTORNEYS

July 7, 1970 HARUHISA FURUISHI ET AL 3,519,842

VOLTAGE SWITCHING DEVICE

Filed Dec. 13, 1965 8 Sheets-Sheet 5

INVENTORS
Haruhisa Furuishi
Yoneji Koyama
BY Stevens, Davis, Miller & Mosher
ATTORNEYS July 7, 1970 HARUHISA FURUISHI ET AL 3,519,842

VOLTAGE SWITCHING DEVICE

Filed Dec. 13, 1965 8 Sheets-Sheet 6

INVENTORS
Haruhisa Furushi
Yoneji Koyama
BY Stevens, Davis, Miller & Mosher
ATTORNEYS INVENTORS
Haruhisa Furuishi
Yoneji Koyama
BY Stevens, Davis, Miller & Mosher
ATTORNEYS July 7, 1970 HARUHISA FURUISHI ET AL 3,519,842

VOLTAGE SWITCHING DEVICE

Filed Dec. 13, 1965 8 Sheets-Sheet 8

INVENTORS

Haruhisa Furuishi

Yoneji Koyama

BY Stevens, Davis, Miller & Mosher

ATTORNEYS.

3,519,842

VOLTAGE SWITCHING DEVICE

Haruhisa Furuishi, Suita-shi, and Yoneji Koyama, Moriguchi-shi, Japan, assignors to Matsushita Electric Industrial Co., Ltd., Osaka, Japan, a corporation of Japan Filed Dec. 13, 1965, Ser. No. 513,333
Claims priority, application Japan, Dec. 17, 1964, 39/72,409; Apr. 8, 1965, 40/21,272; Apr. 28, 1965 (utility model), 40/333,538; May 18, 1965, 40/29,882; Sept. 9, 1965, 40/55,551, 40/55,552
Int. Cl. H03k *1/12*
U.S. Cl. 307—297 5 Claims

ABSTRACT OF THE DISCLOSURE

A voltage switching device comprising a lower limit voltage switching circuit for cutting off a D.C. load circuit when the applied voltage to the load circuit through said switching circuit has gotten lower than a predetermined voltage and/or an upper limit voltage switching circuit for cutting off the load circuit when the applied voltage has gotten higher than a predetermined voltage; whereby said device supplies power to the load circuit at voltages defined by said predetermined voltages.

The present invention relates to a voltage switching device for automatically interrupting a load circuit by detecting the variation of an input applied voltage when an applied voltage rises or drops over or under a fixed value.

A general object of the invention is to provide a voltage switching device which comprises a signal detection circuit wherein a base of a pre-stage transistor of a trigger circuit employing two transistors is connected to a point between positive and negative input terminals divided by two resistances and a current amplification circuit wherein a collector of a post-stage transistor is connected with a base of a transistor of the type different from said post-stage transistor.

More precisely speaking, the present invention concerns a voltage switching device having a trigger circuit of the modified type formed by inserting resistances between emitter terminals of a direct-coupled amplifier employing two transistors of a different type, the ordinary trigger circuit of said voltage switching device being formed by use of an upper limited voltage switch for automatically interrupting the load circuit in case the input applied voltage from a power source drops under a fixed reference voltage and two similar type transistors, a voltage switching device formed of an upper limited voltage switch for interrupting the load circuit in case the input applied voltage rises over a fixed reference voltage or in combination of said upper limited voltage switch and a lower limited voltage switch, and a voltage gate circuit for charging current to the load only when the input applied voltage remains in a certain range of voltage.

The present invention also includes an automatic voltage switching device for automatically providing a number of batteries required for supplying allowable voltage to the load to make a switching operation applying said upper limited voltage switch to a plurality of batteries arranged in series and variable in voltage and voltage switching device adapted to act at a constant reference voltage irrespective of variation of peripheral temperatures applying temperature compensation to said upper limited voltage switch and said lower limited voltage switch.

The voltage switching device according to this invention is adapted for use to prevent the excessive discharge of a dry battery or the excessive charge of a storage battery, to avoid leaking of liquid due to excessive discharge of the dry battery, protecting the device in use of batteries from damages and eliminating deterioration of characteristics of a battery caused from excessive charge of the storage battery, and also to prevent the occurrence of accidents.

In the conventional direct current circuit having a battery as a power source, drawbacks were found in that excessive discharge of a dry battery caused leakage of liquid and gave no small damage to a device employing batteries. Furthermore, lowering of the power source voltage gave rise to variation in the characteristic of a circuit that has already been provided.

Also in a storage battery of the closed type, frequent occurrence of excessive charge and discharge adversely affected the characteristic of a battery during operation in later stages and occasionally and unexpectedly induced explosion of the battery.

The removal of such drawbacks has, therefore, necessitated the provision of a voltage switch to interrupt the load circuit automatically whenever the voltage rises or drops over or under the reference voltage.

Most of the voltage switches which have been adopted conventionally for the above-mentioned purposes included electromagnetic voltage relays which however brought a great loss of electricity and the undesirable effects of anti-oscillation and wear resistance in addition to a variety of electrical and mechanical troubles such as hysteresis loss and chattering in voltage during the On and Off periods.

Other conventional voltage switches were mostly adapted to perform the switching of a circuit by providing a reference operating voltage by means of a constant-voltage diode (Zener diode). However, the constant-voltage diodes of the same kind could not be easily obtained. Ordinarily, electron avalanche occurred even with the rise or drop of voltage even in 7 to 9 v. and the operating characteristic became worse. It has required several ma. of current for attaining an operating stability so that considerable loss of electricity was not inevitable for the circuit having a power source of limited voltage.

One object of the present invention is, therefore, to provide a voltage switching device which is capable of removing such drawbacks, while ensuring small power loss, good anti-oscillation and wear resistance beside deficiency of hysteresis and chattering.

The nature of the invention will be more clearly understood from a detailed description of preferred embodiments of the invention with reference to the accompanying drawings in which.

Figure 1:
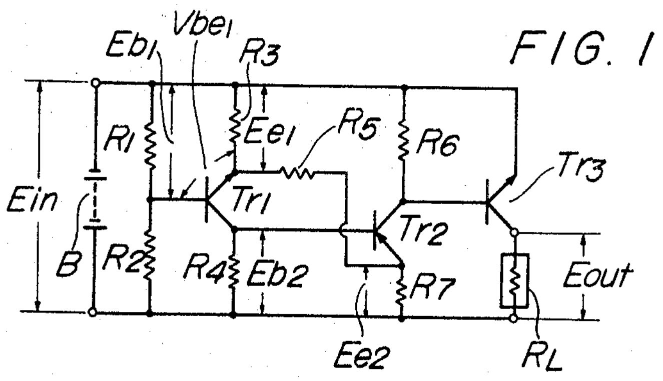
FIG. 1 is a circuit diagram of the upper limited voltage switch of an embodiment of this invention.

Referring now to FIG. 1, a preferred embodiment will now be illustrated.

In the figure, $Tr_1$ denotes an NPN transistor and $Tr_2$ denotes a PNP transistor. Emitters of both transistors are connected through a resistance $R_5$. A base of the transistor $Tr_1$ is connected to a point of connection between resistances $R_1$ and $R_1$ which are connected in parallel to a power source B. The emitter of the transistor $Tr_1$ is connected to the negative electrode of the battery B through a resistance $R_3$ and the collector to the positive electrode of the battery B, respectively. The emitter of the transistor $Tr_2$ is connected to the positive electrode of the battery B through a resistance $R_7$ and the collector to the negative electrode of the battery B through a resistance $R_6$.

$Tr_3$ denotes an NPN transistor which forms a current amplification circuit, the base of which is connected to the collector of the transistor $Tr_2$ and the emitter of which is connected to the negative electrode of the battery B, while the collector of which is connected to the positive electrode of the battery B, respectively.

The invention is particularly characterized by the provision of a feed back means connecting through a resistance $R_5$ of the emitter terminal of a D.C. amplifier in use of transistors $Tr_1$ and $Tr_2$ of the different type and a detection means for detecting variation of input voltage by connecting a base of the pre-stage transistor $Tr_1$ in the point of connection of the resistances $R_1$ and $R_2$ which are connected in parallel to the battery B thereby to form a trigger circuit of the modified type. The transistor $Tr_3$ herein provided is a transistor for amplifying electric current for intermittently flowing a large load current.

In the relationship of the transistors $Tr_1$, $Tr_2$ and $Tr_3$, if the transistor $Tr_1$ is in the On condition, the transistors $Tr_2$ and $Tr_3$ will turn On and when the transistor $Tr_1$ is in the Off condition, the transistors $Tr_2$ and $Tr_3$ will turn Off and thereby charging of current to the load is interrupted.

According to the relationship of a base voltage $Eb_1$, an emitter voltage $Ee_1$ and operating voltage $Vbe_1$ of the transistor $Tr_1$, the operation of the device in turning from Off to On is accomplished on the condition that the following formula has been established:

$$Eb_1 - Ee_1 \geqq Vbe_1 \quad (1)$$

An equivalent circuit considering the power source when the device is in the Off condition consists of a closed circuit containing the resistances $R_1$ and $R_2$ and a closed circuit containing the resistances $R_3$, $R_5$ and $R_7$ so that the operation of the device in turning from Off to On is determined only by the aforesaid resistances.

Accordingly, the base voltage $Eb_1$ is determined by the resistances $R_1$ and $R_2$ and also an input voltage $E_{in}$ as follows:

$$Eb_1 = \frac{R_1}{R_1 + R_2} \times E_{in} \quad (2)$$

On the other hand, the emitter voltage $Ee_1$ is determined by the resistances $R_3$, $R_5$ and $R_7$ and the input voltage $E_{in}$ as follows:

$$Ee_1 = \frac{R_3}{R_1 + R_2 + R_3} \times E_{in} \quad (3)$$

Therefore, the value $E_1$ of the input voltage $E_{in}$ when the circuit turns from Off to On is obtained from the Formulas 1 to 3.

There results $$E_1 = \frac{Vbe_1}{\frac{R_1}{R_1 + R_2} - \frac{R_3}{R_3 + R_5 + R_7}} \quad (4)$$

Should the input voltage $E_{in}$ turn $E_1$, then $$Eb_1 - Ee_1 > Vbe_1$$

and the collector current flows in the transistor $Tr_2$ and the following regenerative action is effected.

Collector current of $Tr_2$ starts to flow ↘

→ $Eb_1 - Ee_1 \gg Vbe_1$ → Collector current of $Tr_2$ increases → $Eb_2$ rises → $Ee_1$ drops → (back to start)

Figure 3:
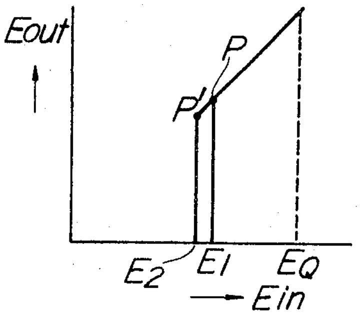
FIG. 3 is a schematic diagram showing the operating characteristic of the voltage switch of this invention.

After $Eb_1 - Ee_1 \geqq Vbe_1$ has been attained, the voltage of $E_{out}$ at a point P is impressed on the output by triggering in the period of the input voltage $E_1$ by said regenerative action as shown in FIG. 3. In the output voltage $E_{out}$ in said period, $Vce_3$(SAT) becomes small since the transistor $Tr_3$ is in a saturated condition. Then a voltage which is almost equal to the input voltage is applied on the load. Even when the input voltage rises and reaches $E_Q$, there will be obtained an output voltage of $E_{out}$ proportional to the input voltage since the former is in a stable point of operation.

The operation of the device in turning from On to Off is accomplished when a formula $Eb_1 - Ee_1 - A < Vbe_1$ has been established.

By a regenerative action reverse to the preceding case, the current returns from a point P′ to zero. That is to say, the collector current $Tr_2$ decreases in the following way:

→ $Eb_1 - Ee_1 - A \ll Vbe_1$ → Collector current of $Tr_2$ decreases → $Ee_2$ drops → $Ee_1$ rises → (back to start)

As shown in FIG. 3, the input voltage upon turning from On to Off is $E_2$ and there is established a relationship of $E_1 > E_2$ which is caused from the backlash effect which is inherent in the switching circuit of a transistor. The magnitude of this value varies depending on the loop gain. Therefore, if $A=1$, there would result $E_1=E_2$; if $A<1$, $E_1<E_2$, and if $A>1$, $E_1>E_2$.

Since $A>1$ in the device of this invention, a voltage diference between $E_1$ and $E_2$ or the magnitude of the hysteresis value can vary with the change of the aforesaid loop gain A and thereby a desirable circuit can be formed by determining it with the value of the resistance $R_5$. When the value of the resistance $R_5$ is small, the value of hysteresis would be large and when the value of the resistance $R_5$ is large, the value of hysteresis would be small.

Thus, by connecting the emitters of the transistors $Tr_1$ and $Tr_2$ of the different type with each other through the resistance $R_5$ and connecting the base of the pre-stage transistor $Tr_1$ to the point of connection of the resistances $R_1$ and $R_2$ connected in parallel to the power source B, it is capable of attaining an excellent switching operation so as to be interrupted or saturated with reference to the value of voltage obtained by the Formula 4.

However, it should be noted that, by omission of the resistance $R_5$ from between the transistors $Tr_1$ and $Tr_2$, the voltage between the base and emitter terminal of the pre-stage transistor $Tr_1$ will reach an operating voltage $Vbe_1$ and thereby the transistors $Tr_1$, $Tr_2$ and $Tr_3$ will become conductive. Further, as the input voltage rises and shifts from the unsaturated condition to the saturated condition, the characteristic of the rising operation will become bad, so much so that it became incapable of performing a complete interruption because of the long operating time of the activated region and electron avalanche as seen in the $Vbe-I_c$ characteristic of the transistor.

One embodiment in which the aforesaid upper limited voltage switch was employed as a means for preventing overdischarge of the dry battery will be presently described.

Figure 4:
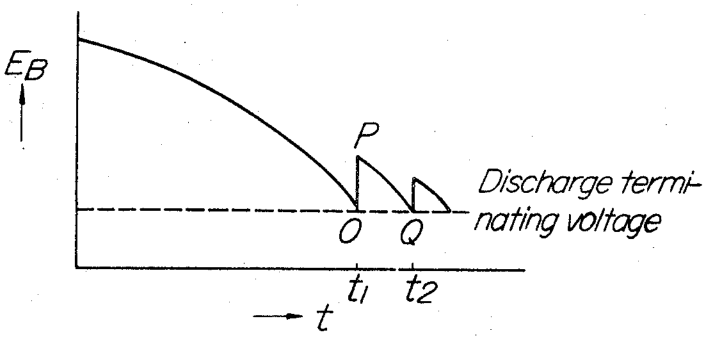
FIG. 4 shows a variation characteristic of output voltage of a battery when the battery is charged or discharged.

First, a load was connected between positive and negative terminals for starting discharge. When the voltage reaches a discharge terminating voltage, the load was intercepted and the battery voltage was examined. The result obtained is shown in FIG. 4. If the load is interrupted intentionally upon reaching a terminating voltage a period of time $t_1$ after the discharge, the output voltage triggers from a point O to the point P instantaneously. If the load is again connected and the discharge is started at the point P, the voltage reaches the discharge terminating voltage again after a period of time $t_2$. In this manner, the same operation is repeated several times.

If the device is operated as an upper limited voltage switch for preventing overdischarge of a battery and if a hysteresis value is too small, it often occurs that the voltage of the battery triggers in an instant and the circuit which has once turned Off will turn On again thus causing chattering at the time when the load current is intercepted. Such trigger of voltage of the battery varies with the kind and operation of the battery so that the resistance $R_5$ may preferably be adjusted to obtain a value of hysteresis fitted to such characteristic as described.

Moreover, the operating voltage of the circuit in the present device is determined in proportion to the dividing ratio of the resistance $R_1$ and $R_2$ so that the operating point can easily be provided.

Figure 2:
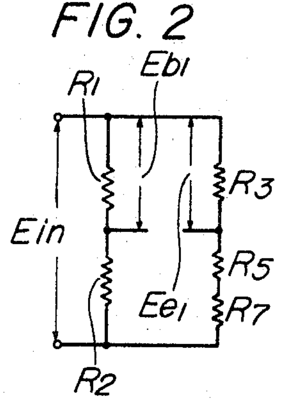
FIG. 2 shows equivalent circuits of the voltage switch of this invention in the Off condition.

The consuming current upon the circuit being intercepted is the current to be consumed by the resistances $R_1$ and $R_2$ and $R_3$, $R_5$ and $R_7$, such as shown in the equivalent circuit in FIG. 2, so that by selecting the values of such resistances possibly large in magnitude, it is possible to limit the power loss to a minimum.

Figure 5:
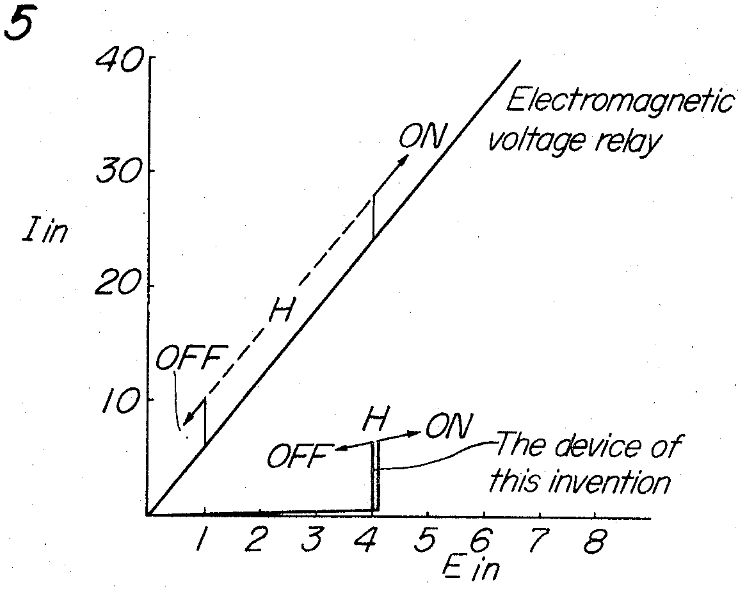
FIG. 5 is a diagram showing comparative lines showing characteristics of the voltage switch of this invention in FIG. 1 and the conventional electromagnetic voltage relay.

For example, a comparison has been made with respect to the operating characteristics of the upper limited voltage switch of cut off voltage 4 v., load current 150 ma. rating according to this invention with the conventional electromagnetic voltage relay. The result is shown in FIG. 5. In carrying out the experiment the circuit data of the upper limited voltage switch of this invention were defined as follows:

$$R_1=10\ K\Omega,\ R_2=39\ K\Omega,\ R_3=510\Omega,\ R_4=22\ K\Omega$$
$$R_5=7.5\ K\Omega,\ R_6=2.2\ K\Omega,\ R_7=1\ K\Omega,\ Tr_1=2SC\text{-}183$$
$$Tr_2=2SB\text{-}172,\ Tr_3=2SC\text{-}182$$

No-load current in the On and Off conditions and the value of hysteresis in the On and Off conditions are shown in the table below. Accordingly, it is seen that the device of the present invention has excellent characteristics.

| | On (v.) | Off (v.) | On (ma.) | Off (ma.) | Hysteresis value |
|---|---|---|---|---|---|
| Conventional device | 4 | 1 | 23 | Off to On 22, On to Off 6. | 3 |
| Device of this invention | 4.1 | 4.0 | 3.5 | 0.55 | 0.1 |

In FIG. 5, the arrow "On" denotes an operating point when the voltage was increased gradually from zero upwards, while the arrow "Off" denotes a non-operating point when the voltage dropped from the On condition. In this instance, H shows a value of hysteresis or the voltage in the On and Off conditions.

Next, another embodiment of the upper limited voltage switch is illustrated with reference to FIG. 6.

In the embodiment of FIG. 1, it has been shown that when the input voltage reaches a cut-off voltage, the load circuit is intercepted thereby reducing the load current to zero, and, as in FIG. 2, showing an equivalent circuit in the Off condition, some hundreds of ma. current flow normally due to the resistances $R_1$, $R_2$ and $R_3$, $R_5$ and $R_7$ thus causing a loss. Further, when the load current is so low as some ma., the leaking of liquid of the battery for preventing the overdischarge is much lessened in effect. Therefore, the embodiment shown in FIG. 6 is intended to minimize the aforementioned loss of current as much as possible. The difference of the embodiment from the one shown in FIG. 1 resides in the position of connection of the transistor $Tr_3$ for amplifying the current, so that an arrangement was made in the manner that the transistor $Tr_3$ is connected to the negative input side for the switching operation. Then, if an Off condition has been set up, the power supply for the switching circuit and the load are interrupted and the input current turns zero.

In the preceding arrangement, resistances are provided by insertion between the emitter terminals of the D.C. amplifier employing transistors $Tr_1$ and $Tr_2$ of the different type thus to form a different trigger circuit therein. The base of the NPN transistor in the pre-stage is connected to the point of connection between the resistances $R_1$ and $R_2$. Between the resistance $R_1$ and the negative electrode, there is connected the NPN transistor $Tr_3$ so that the emitter will come to a side of the negative electrode of the battery B and the collector to a side of the resistance $R_1$. The base of the transistor $Tr_3$ is connected to the collector of the PNP transistor $Tr_2$ in the post-stage. Herein C denotes a condenser for starting operation and it is provided by insertion between the emitter and collector of the transistor $Tr_3$. Said condenser is adapted to enable the input voltage $E_{in}$ to be instantaneously impressed on both ends of the resistances $R_1$ and $R_2$. $R_6$ is a resistance provided for reducing the current when it is placed between the base and the emitter of the transistor $Tr_3$. The load $R_L$ is connected between the positive electrode of the battery B and the collector of the transistor $Tr_3$. In the operation of this device, the transistor $Tr_3$ is used in a state of saturation so that the voltave $Vce_3$(SAT) between the emitter and the collector is extremely small and the power source voltage $E_{in}$ and the voltage impressed on both ends of the resistances $R_1$ and $R_2$ are almost equal. Accordingly, the condition of the circuit in the On and Off conditions is entirely the same as in the embodiment shown in FIG. 1, wherein, if the interpole voltage between the base voltage $Eb_1$ and emitter voltage $Ee_1$ of the transistor $Tr_1$ is higher than the operating voltage $Vbe_1$ in value, the circuit remains in the On condition and, in the reverse case, the circuit will be in the Off condition.

Since the signal applied voltage of the base of the transistor $Tr_3$ becomes zero when the circuit is in the Off condition, the transistor $Tr_3$ turns completely Off and the current from the power source turns almost zero leaving only the current for the transistor $Tr_3$. At this time the battery B is in a no-load condition so that the battery voltage seems to trigger in an instant and to turn On once again as described about the embodiment in FIG. 1. However, in the present embodiment, the transistors $Tr_1$, $Tr_2$ and $Tr_3$ are arranged in such a relationship that after $Tr_1$ and $Tr_2$ turn On, $Tr_3$ turns On by a delay phenomenon so that the battery voltage does not turn On again by its trigger.

Now it is to be understood that the circuit just turns from Off to On either when the switch SW is turned from Off to On when the input voltage is larger in value than the voltage as attained by the Formula 4 or when the power source battery is replaced by another power source battery having the switch SW in the On condition. Due to such an operation, there is no chattering when the load current is intercepted irrespective of the magnitude of the value hysteresis.

The condenser C acts for starting the transistors $Tr_1$ and $Tr_2$ to turn On by impressing the input voltage $E_{in}$ on both ends of the resistances $R_1$ and $R_2$ in an instant when the switch SW is turned from Off to On. After the transistors $Tr_1$ and $Tr_2$ turn On, the base of the transistor $Tr_3$ is impressed with the signal voltage through the collector of the transistor $Tr_2$. Then the transistor $Tr_3$ turns On and the load $R_L$ is impressed with the voltage $E_{out}$ being almost equal to the input voltage.

Figure 7:
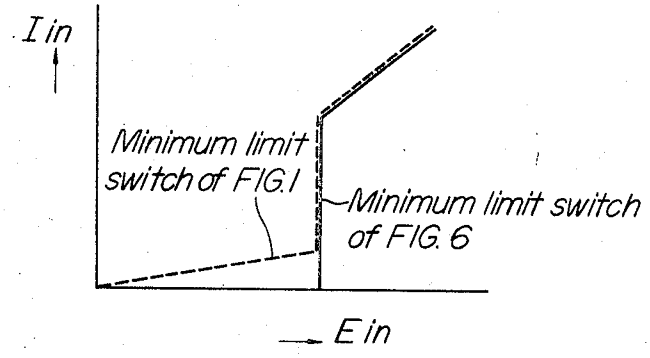
FIG. 7 is a diagram showing the characteristics of the upper limited voltage switch in FIG. 6 and the voltage switch in FIG. 1.

The operating characteristic of the embodiment will now be illustrated with reference to FIG. 7 in contrast with the one shown in the embodiment of FIG. 1. Here the upper limited voltage switch is shown in solid lines. If the input voltage $E_{in}$ gradually drops and reaches an operating point in the Off condition, the circuit will be completely intercepted. In the arrangement shown in FIG. 1, however, the consuming current due to the resistances $R_1$ and $R_2$ and $R_3$, $R_5$ and $R_7$ flows always in the circuit as shown by dotted lines.

Therefore, the device of this embodiment does not suffer any loss of power in the period of Off condition and no chattering takes place in the cut-off period of load current irrespective of the magnitude of the value of hysteresis.

Figure 6:
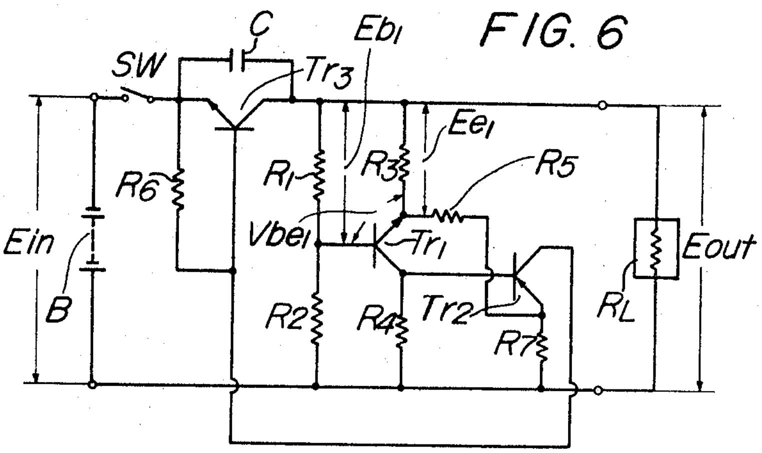
FIG. 6 is a circuit diagram of the upper limited voltage switch in another embodiment of this invention.
Figure 8:
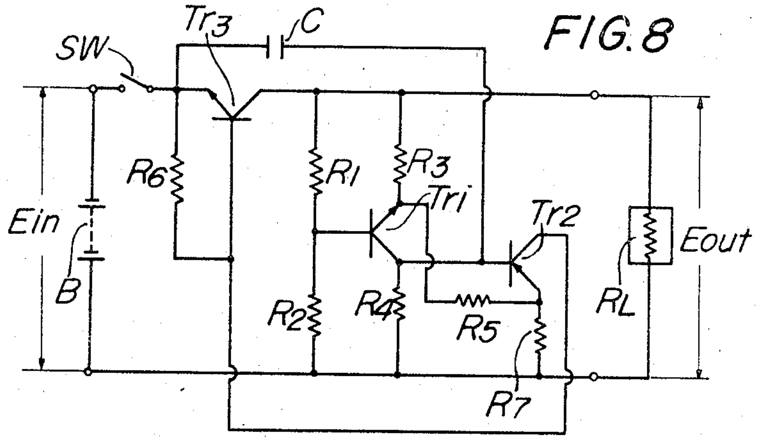
FIG. 8 shows a circuit of the upper limited voltage switch in another embodiment of this invention.

FIG. 8 shows an embodiment of the upper limited voltage switch which has been somewhat improved over that shown in FIG. 6.

Since, in the embodiment of FIG. 6, a condenser C for starting purpose is connected between the emitter and collector of the transistor $Tr_3$, said condenser must have a capacity necessary for flowing the load current in an instant and therefore it is desirable to prefer a larger electrostatic capacity in proportion to the load current.

In comparison, the embodiment in FIG. 8 shows that the position of connection of the condenser C is located between the emitter of the transistor $Tr_3$ and the base of the transistor $Tr_2$ with other parts of the construction of which are quite similar to the embodiment of FIG. 6.

Operation of the aforesaid embodiment of FIG. 8 will now be described more in detail. Although in the embodiment shown in FIG. 6 the input voltage $E_{in}$ applied instantaneously between the ends of the resistances $R_1$ and $R_2$ and the transistors $Tr_1$ and $Tr_2$ become conductive and thereafter the transistor $Tr_3$, in FIG. 8, the transistor $Tr_2$ becomes conductive through the emitter-base of the transistor $Tr_2$ and further the condenser C instantaneously and, thereby, the transistor $Tr_3$ become conductive in order to obtain a stable operating condition. At the starting of operation, therefore, it is possible to attain an operating condition by means of the transistors $Tr_2$ and $Tr_3$ without relation to the transistor $Tr_1$ so that the operating time may be shortened. Also, the capacity of the condenser C can be small so as to allow a sufficiently small quantity of current to flow to the base of the transistor $Tr_2$ and it can be much smaller than that of FIG. 6 in capacity.

In this respect, the device is more economical than that of FIG. 6 in the shorter operating time, much higher stability, and smaller electrostatic capacity for the condenser C.

Illustration will now be made about the lower limited voltage switch for interrupting the load circuit when the input voltage rises over a reference voltage in contrast to the aforesaid upper limited voltage switch for interrupting the load circuit when the input voltage drops below a fixed reference voltage, and also about a voltage gate circuit for supplying a current to the load by combination of the upper limited voltage switch and the lower limited voltage switch only when the input voltage stays in a predetermined range of value.

Figure 9:
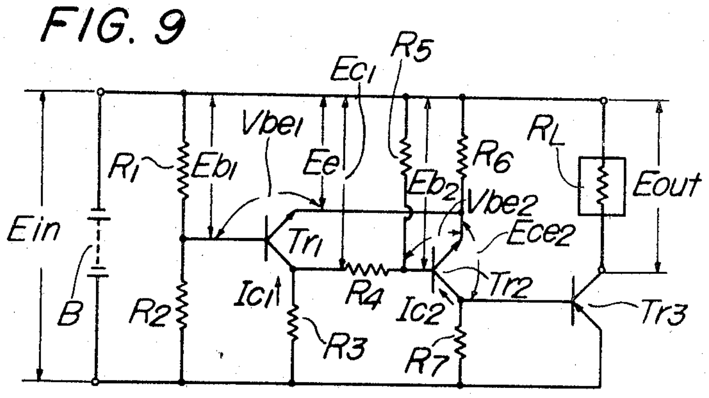
FIG. 9 is a circuit diagram showing an embodiment of the lower limited voltage switch.

FIG. 9 shows one embodiment of such lower limited voltage switch as described, in which, $R_1, R_2 - - - R_7$ denote fixed resistances; $Tr_1$ and $Tr_2$ NPN transistors; $Tr_3$ a PNP transistor; B a power source battery; and $R_L$ a load. A Schmitt circuit is formed of the transistors $Tr_1$ and $Tr_2$ of similar type and the resistances $R_3$ to $R_7$. In the dividing point of the resistances $R_1$ and $R_2$ which are connected in parallel to a power source B there is formed a detection part for detecting variation of the power source voltage and at the output terminal of said Schmitt circuit there is provided a current amplification circuit formed of the transistor $Tr_3$ of the type different from the transistors forming the Schmitt circuit. Thus the current flowing to the load $R_L$ which is connected to the output terminal collector of said current amplification circuit and one end of the power source B is intermittently flowed at a value in proximity of a reference voltage as determined by the circuit constant.

The principal operation of the device will follow. When the input voltage $E_{in}$ is lower than said reference voltage, the transistor $Tr_1$ is in the Off condition and $Tr_2$ in the On condition and simultaneously $Tr_3$ turns On, whereby the condition where the output voltage $E_{out}$ which is almost equivalent to the input voltage $E_{in}$ is obtained. Reversely, when the input voltage $E_{in}$ is higher than the reference voltage, the transistor $Tr_1$ is in the On condition and $Tr_2$ in the Off condition and the transistor $Tr_3$ turns Off, whereby the output voltage turns zero.

The performance and the requirements of performance of the device above will more in detail be explained.

In the above embodiment, the reference voltage means the input voltage when the interpole voltage of the base voltage $Eb_1$ and emitter voltage $Ee_1$ of the transistor $Tr_1$ turn to an operating voltage $Vbe_1$ by the formula $$Eb_1 - Ee_1 = Vbe_1$$

as mentioned above.

Now assume that the input voltage $E_{in}$ is low and it rises gradually from the Off condition of the transistor $Tr_1$ and the On condition of the transistor $Tr_2$ and the transistor $Tr_1$ turns On, then the circuit condition at this time, or when the transistor $Tr_1$ turns On, is shown by the formula $$Eb_1 - Ee_1 > Vbe_1 \quad (5)$$

Above base voltage $Eb_1$ when the transistor $Tr_1$ is in the Off condition is defined by the resistances $R_1$ and $R_2$ and the input voltage $E_{in}$.

Therefore, $$Eb_1 = \frac{R_1}{R_1 + R_2} \times E_{in} \quad (6)$$

Since the emitter voltage $Ee_1$ of the transistor $Tr_1$ depends on the resistances $R_6$ and $R_7$ and the emitter base resistance $Reb_3$ of the transistor $Tr_3$ and the input voltage $E_{in}$, it would be $$Ee_1=\frac{R_6}{R_6+\frac{R_7\times Reb_3}{R_7+Reb_3}}\times E_{in} \quad (7)$$

Accordingly, the input voltage when the transistor $Tr_1$ being in the Off condition, turns On and the transistor $Tr_2$ being in the On condition, turns Off will be as follows from the Formulae 5, 6 and 7:

$$E_1=\frac{Vbe_1}{\frac{R_1}{R_1+R_2}-\frac{R_6}{R_6+\frac{R_7\times Reb_3}{R_7+Reb_3}}} \quad (8)$$

Hence the refernece voltage $E_1$ during operation can be obtained.

Figure 10:
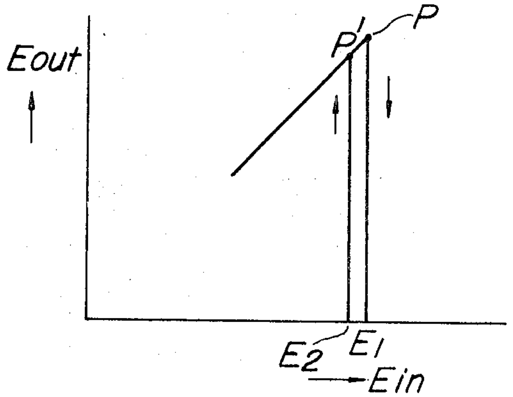
FIG. 10 shows an operating characteristic of the lower limited voltage switch in FIG. 9.

Examining the performance of each part of the device, it is first found that when the input voltage $E_{in}$ is low, the transistor $Tr_1$ is in the Off condition and the transistor $Tr_2$ is in the On condition and the collector-emitter voltage $Ece_2$ and operating voltage $Vbe_2$ of the transistor$Tr_2$ are respectively in saturated states $$(E_{ce2}(SAT) \text{ and } Vbe_2(SAT))$$

so that the collector current $I_{c2}$ of the formula flows and stays always at a stable point.

$$I_{c2}=\frac{E_{in}-Ece_2(SAT)-Ee}{\frac{R_7\times Reb_3}{R_7+Reb_3}}=\frac{(E_{in}-Ece_2(SAT)-Ee)(R_7+Reb_3)}{R_7\times Reb_3} \quad (9)$$

whereby the output voltage $E_{out}$ is obtained as shown in FIG. 10 and it is impressed on the load $R_L$.

Next, when the input voltage $E_{in}$ rises and there is established the relationship of Formula 5, the collector current $Ic_1$ flows out to the transistor $Tr_1$. Then by the regenerative cycle shown below, the current returns to zero rapidly from the point P as shown in FIG. 2. The input voltage at this time is $E_1$. Thus From $Eb_1-Ee_1>E_{bel}$ $I_{c1}$ flows out→
→$E_{b1}-E_{e1}\gg V_{be1}$→$E_{c1}$ increases→$E_{c1}$ drops→
$Ee$ drops←$Eb_2$ drops←

Reversely, when the input voltage is high and the transistor $Tr_1$ which is in the On condition turns Off and the transistor $Tr_2$ which is in the Off condition turns On, the output voltage triggers from zero to the point P′ with the input voltage being $E_2$ as shown in FIG. 10 due to the regenerative performance inversely to the preceding case. This is shown by $$Eb_1-E_{e1}-A<V_{bel}$$

(A is a loop gain).

Therefore, a cycle below is obtained.

→$E_{b1}-E_{e1}-A\ll V_{be1}$→$I_{c1}$ is reduced→
$E_e$ rises←$E_{b2}$ rises←$E_{c1}$ rises←

There is further a relationship of $E_1>E_2$ between the operating voltage $E_1$ in case the input voltage is gradually increased from low to high and the transistor $Tr_1$ turns On and $Tr_2$ turns Off, and the operating voltage $E_2$, in case the input voltage is gradually decreased from high to low and the transistor $Tr_1$ turns Off and $Tr_2$ turns On, said relationship being caused from the backlash effect inherent in the transistor switch circuit. The magnitude of the value $E_1-E_2$ in this case varies depending on the aforementioned loop gain A.

Here from $$A \gtreqless 1,\ E_1 \gtreqless E_2$$

is obtained, but it is not desirable to make the value of A too small because the characteristic of the rising operation becomes worse.

As described hereinbefore, the lower limited voltage switch of this embodiment has either an interrupted or saturated region at the time of switching operation but has no operating region in the activated region (unsaturated region) so that it can act as a lower limited voltage switch having excellent operating characteristics.

As for example, if said switch may be connected between a storage battery and a charging means, and an operating voltage is provided so that the electric charge to be applied to the storage battery is interrupted by a closing charge voltage, it is quite possible to prevent occurrence of previous accidents due to overcharge of the storage battery.

It is also possible to provide said switch desirably with its operating voltage variable into a dividing ratio of dividing resistances $R_1$ and $R_2$ and to make it endurable against oscillation or shock, whereby it is capable of performing a complete interruption because of its non-contact construction. It has advantages of very little chattering and hysteresis at the cut off time of load current and also minimum electric loss.

Figure 11:
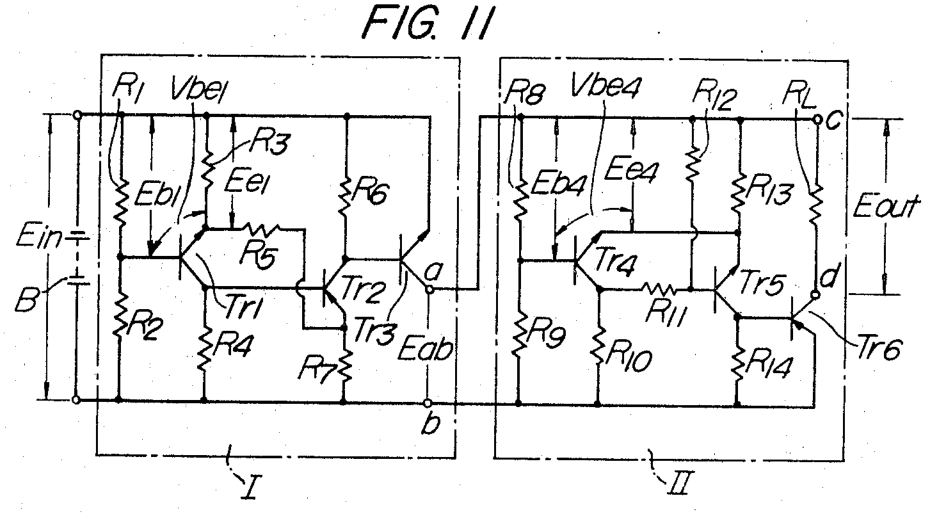
FIG. 11 is a schematic diagram showing an embodiment of the voltage gate circuit according to this invention.

Now with reference to FIG. 11, the voltage gate circuit will now be illustrated. In FIG. 11, there are provided a section (I) enclosed by chain lines indicating the upper limited voltage switch of FIG. 1 and a section (II) enclosed by chain lines showing the lower limited voltage switch as in FIG. 9. This figure shows that the positive electrode input terminal of the lower limited voltage switch (II) is connected to the upper limited voltage switch (I) in the way that the positive electrode of the lower limited voltage switch (II) is connected to the positive electrode of the lower limited voltage switch (I) and the negative electrode of the lower limited voltage switch (II) is connected to the collector of the transistor $Tr_3$.

Figure 12:
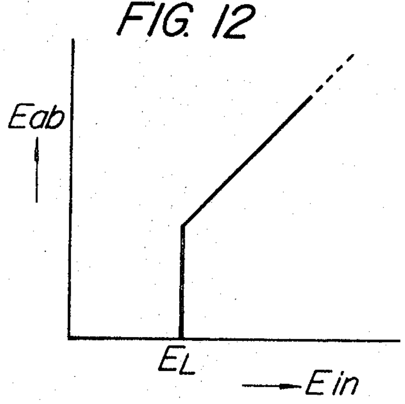
FIG. 12 shows an operating characteristic of the upper limited voltage switch section.
Figure 13:
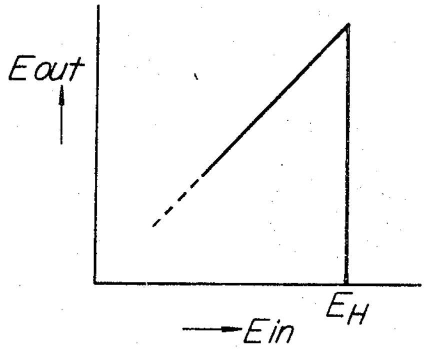
FIG. 13 shows an operating characteristic of the lower limited voltage switch section.

Quite similar principles a ndoperating characteristics are applied to said upper limited voltage switch (I) and lower limited voltage switch (II) as illustrated in FIGS. 1 and 9 and said principles and characteristics are shown in FIGS. 12 and 13, respectively.

Explaining in detail, the upper limited voltage switch (I) is, if the input voltage $E_{in}$ is higher than $E_L$ the load circuit turns On and a voltage $Eab$ is impressed on the output and if the input voltage is lower than $E_L$ the load circuit turns Off and the output voltage turns zero.

On the other hand, in the lower limited voltage switch (II), if the input voltage $Eab$ is higher than $E_H$ the load current turns Off and the output voltage turns zero, and, if the input voltage $Eab$ is lower than $E_H$ the load circuit turns On and a voltage $E_{out}$ is impressed on the output.

At this time the operating voltage $E_L$ and $E_H$ are represented by the following formulae:

$$E_L=\frac{V_{be1}}{\frac{R_1}{R_1+R_1}-\frac{R_3}{R_3+R_5+R_7}} \quad (10)$$

$$E_H=\frac{V_{be5}}{\frac{R_8}{R_8+R_9}-\frac{R_{13}}{R_{13}+\frac{R_{14}\times R_{eb6}}{R_{14}+R_{eb6}}}} \quad (11)$$

Here the transistor $Tr_3$ and $Tr_6$ are applied in a completely saturated state and $Vcs$(SAT) of the transistor $Tr_3$ and $Tr_6$ are very slight.

Therefore, $$E_{in} \doteqdot Eab \qquad Eab \doteqdot E_{out}$$

Hence $$E_{in} \doteqdot E_{out}$$

Figure 14:
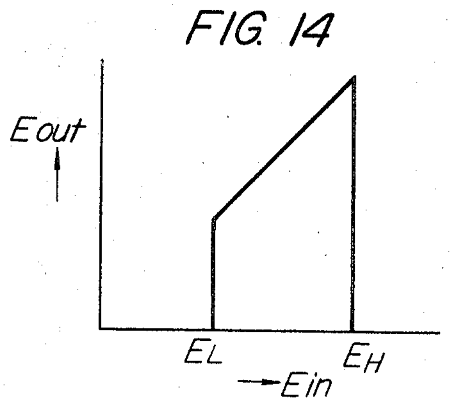
FIG. 14 shows an operating characteristic of the gate circuit of the lower limited voltage switch section in FIG. 13.

Accordingly, if the relationship of the operating voltage $E_L$ of the upper limited voltage switch (I) and the operating voltage $E_H$ of the lower limited voltage switch (II) is assumed $E_L < E_{H1}$, there would be applied a voltage, $E_{out}$ approximate to the input between the output terminals *c–d* as shown in FIG. 14 on condition that the input voltage is assumed to be $$E_L \leqq E_{in} \leqq E_H$$

The voltage gate circuit shown in that embodiment is most advantageously used in some precision electrical machineries such as employing a power source of limited and variable voltage as a battery which is not capable of securing precision of allowance unless the input voltage remains in certain range of voltage.

Said upper limited voltage and lower limited voltage are respectively determined by the dividing ratio of resistances $R_1$ and $R_2$ and also the dividing ratio of the resistances $R_8$ and $R_9$ so that they can desirably be provided according to necessity.

Figure 15:
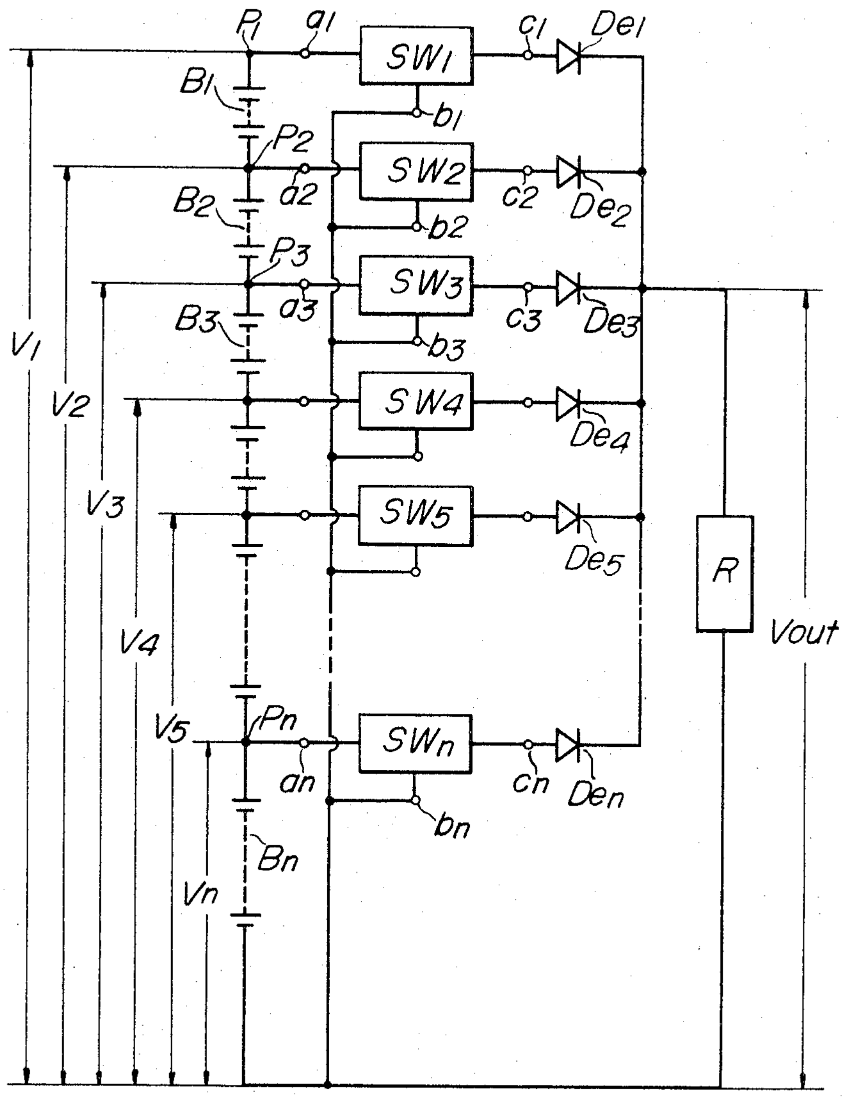
FIG. 15 is a circuit diagram showing an embodiment of the automatic voltage switch.
Figure 16:
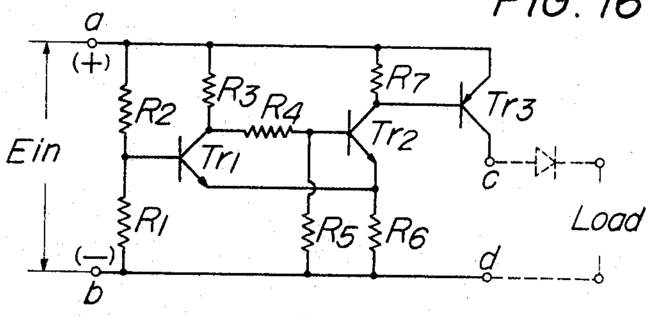
FIG. 16 is a circuit diagram of the lower limited voltage switch section of the device in FIG. 15.

The following example will give a modified embodiment of the lower limited voltage switch as described in FIG. 9 with respect to an automatic voltage switch. Referring now to FIG. 15, $B_1$, $B_2$ . . . $B_n$ denote *n* power source batteries which are connected in series in sequence. The lower limited voltage switches, $SW_1$ $SW_2$ . . . $SW_n$, as shown in FIG. 16, have input terminals $a_1$, $a_2$ . . . respectively connected to the positive electrodes of power sources batteries $B_1$, $B_2$ . . . or contact points $P_1$, $P_2$ . . . $P_n$ of the power source batteries. The input terminals $b_1$, $b_2$ . . . are connected to the negative electrodes of the power source batteries, respectively.

The output terminals $C_1$, $C_2$ . . . of the switches $SW_1$, $SW_2$ . . . $SW_n$ are connected by rectifiers $De_1$, $De_2$ . . . $De_n$ respectively in the forward direction and connected at a common point, between which and the negative electrode of the power source battery is connected a load R.

Assume now that the operating voltage of the switches $SW_1$, $SW_2$ . . . $SW_n$ be E, said operating switch would turn Off if the input voltage of respective switches are higher than E and said operating voltage would turn Off if said input voltages are lower than E so that when the input voltage $V_1$ of the switch $SW_1$, namely, the total voltages of power source batteries in a group assumes $V_1 < E$, the switch $SW_1$ turns On and the load R is applied a voltage equivalent to $V_1$. At this time the input voltages $V_2$ . . . $V_n$ of the switches $SW_2$ . . . $SW_n$ are lower than E, the switches $SW_2$ . . . $SW_n$ turn On and the load R is seemingly impressed with $V_2$ . . . $V_n$. Since there is established a formula of $V_1 > V_2 > \ldots > V_n$, the load current will not flow even if the switches $SW_2$ . . . $SW_n$ are in the On condition. From the switch $SW_1$, however, there is formed, besides the load current, a closed circuit passing through the switches $SW_2$ . . . $SW_n$ respectively and also through individual battery terminals $P_1 - P_2 \ldots P_n - P_1$. Therefore, this construction will cause an excessive power loss so that rectifiers $De_1$ . . . $De_n$ may be connected thereto in order to prevent the flow of current to turn in the reverse direction.

Next, when the input voltage $V_1$ being impressed on the switch $SW_1$ becomes $V_1 > E$, $V_2 \ldots V_n < E$ due to change of condition of battery application, the switch $SW_1$ turns Off and the switches $SW_2$ . . . $SW_n$ turn On. Then, only $V_2$ is applied to load R.

A similar procedure is taken when the voltage rises and $V_n$ solely becomes lower than E, whreupon only $V_n$ is impressed on the load R.

One instance is now considered, reverse to the above case, when the voltage of the power source battery gradually drops. Assuming the above relationship being $V_n < E$, $V_{n1} > E$ initially, only $V_n$ turns On and nothing other than $V_n$ is impressed on the load R. By successive occurrence of voltage drops, the input voltage turns as for example to $V_5 < E$, $V_6 > E$, then the load R is impressed only by the voltage of $V_5$.

Thus, if the voltage drops and turns from $V_1 > E$ to $V_1 < E$ the voltage $V_1$ is impressed on the load R.

It will, therefore, be appreciated that even if the voltages of the power source batteries $B_1$, $B_2$ . . . $B_n$ may vary, an almost constant voltage determined by the operating voltage E of the switches $SW_1$, $SW_2$ . . . $SW_n$ is impressed on the load R.

Figure 17:
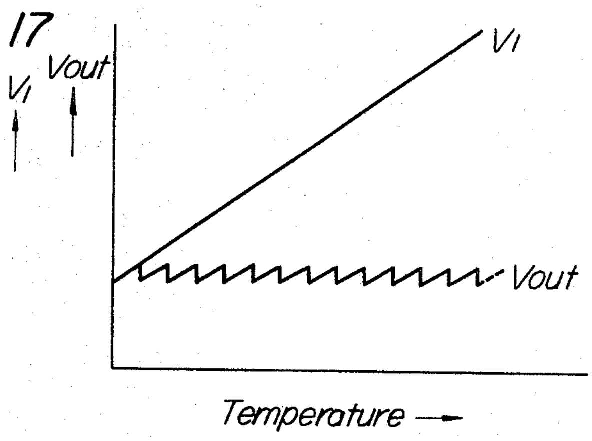
FIG. 17 shows an output characteristic of the device in FIG. 15.

An investigation was made on the relationship of the temperature variation and the terminal voltage $V_1$ in a fuel cell such as being provided with a plurality of batteries connected in series and have variable terminal voltages with respect to the change of state of application, whereby it was found that the output voltage $V_1$ has changed greatly with the rise of temperature as indicated by a curve $V_1$ in FIG. 17. However, the output voltage $V_{out}$ could maintain an almost fixed value by application of the lower limited voltage switch in combination as shown in FIG. 16, although it was subjected to variation within a certain range.

Such a range of variation of the voltage is to be defined by the battery voltage and the number therof between the switches $SW_1 \sim SW_2$, $SW_2 \sim SW_3$ . . . $SW_{n-1} \sim SW_n$, where it is seen that the smaller is the voltage difference between the switches the less the variation of the voltage.

According to the construction of the lower limited voltage switch such as shown in FIG. 16, and the use of a transistor of the lower limited voltage switch and a transistor of the reverse polarity, positions of the connection thereof can be changed corresponding to the variation of the polarity whereby a similar performance as above can be resumed. If it is required, in the lower limited voltage switch, to apply the base current of the transistor $Tr_3$ with a load current larger than the value multiplied by rate of current amplification, a composite circuit can be constructed in the output stage whereby a circuit may be formed simply to receive any load current.

In such fuel cells as are variable in battery voltage greatly with the change of state of application, the device can well raise the utility of fuels and reduce the operating cost. The present device can also be provided with reserve batteries in series in addition to the required number of batteries for actual use so as to be able to automatically complement the shortage of voltage, which will give another advantage as an accessory of a power source adapted for use in an uninhabited region.

One more embodiment of the automatic voltage switch in use of the lower limited voltage will now be illustrated with reference to FIG. 18.

Figure 18:
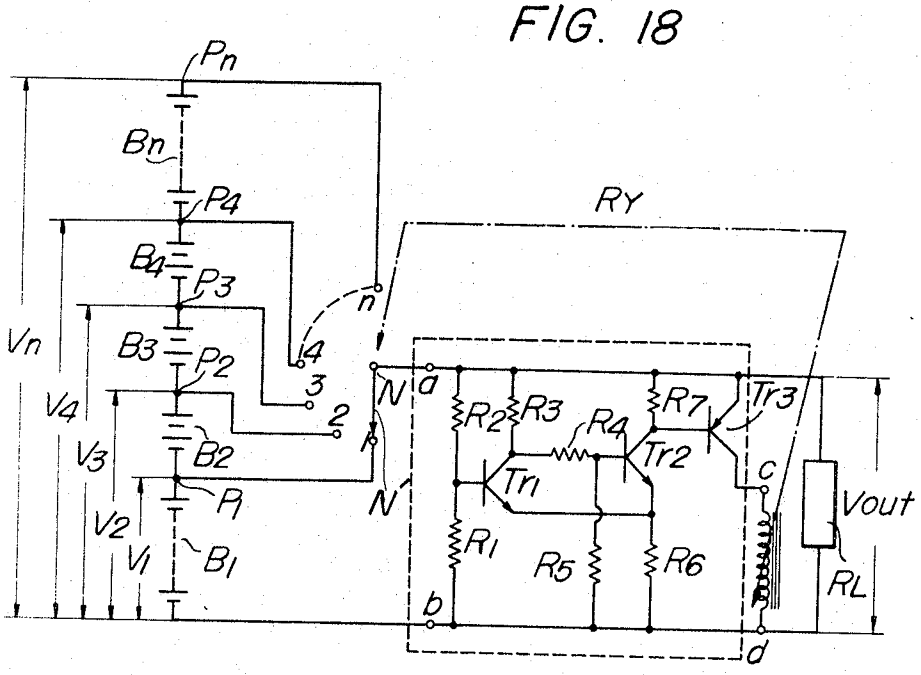
FIG. 18 is a circuit diagram of the automatic voltage switch according to another embodiment of this invention.

In FIG. 18, the lower limited voltage switch as shown in FIG. 9 is enclosed by chain lines and it includes an electromagnetic rotary step switch Ry of one circuit multicontact connected between the output terminals *c–d* of the switch, a fixed terminal N of the switch Ry connected to the positive input terminal *a* of the lower limited voltage switch and shifting terminals $1 \sim n$ connected respectively to the positive electrodes $P_1$, $P_2$ . . . $P_n$ of the batteries $B_1$, $B_2$ . . . $B_n$ of the battery group connecting batteries of lower limited voltage in *n* number sequencial series and the negative electrodes of the batteries in the group connected to the negative input terminals of the lower limited voltage switch, wherein the load $R_L$ is connected between the input terminals *a* and *b* of the lower limited voltage switching device.

The operation of the aforesaid embodiment is carried out in the way that when the applied voltage between the input terminals *a* and *b* of the lower limited voltage switch is higher than the operating reference voltage E, the transistors $Tr_2$ and $Tr_3$ are in a non-conductive state and if it is lower than E, the transistors $Tr_2$ and $Tr_3$ are in a non-conductive state and if it lower than E, the transistors $Tr_2$ and $Tr_3$ are in a conductive state.

Now assuming that a movable contact piece N' having one end connected to a fixed terminal N of the rotary step switch Ry is connected to a contact point 1, the voltage $V_1$ of the battery $B_1$ is impressed between the input terminals *a* and *b* of the lower limited voltage switch. If the voltage $V_1$ is higher than the operating reference voltage E of the lower limited voltage switch, the lower limited voltage switch will be in a non-conductive state, while the contact of the contact piece N' and the contact point 1 is maintained unchangeably and the load $R_L$ is impressed by the voltage $V_1$.

The input voltage $V_1$ then drops gradually from this stable operating condition and reaches the operating reference voltage E, whereup the lower limited voltage switch assumes a conductive condition and the rotary step switch Ry operates. The contact piece N' moves to the contact point 2. On the load $R_L$ is impressed the aggregate voltages of the battery $B_1$ and the battery $B_2$. When the contact piece N' and the contact point 2 are connected, the applied voltage on the lower limited voltage switch turns $V_2$ which is higher than the operating reference voltage E so that the lower limited voltage switch becomes non-conductive in an instant and the condition of contact of the contact piece N' and the contact point 2 is maintained invariably.

In the same manner, if the applied voltage $V_2$ drops lower than the voltage E, the contact piece N' shifts to the contact point 3 and similarly the contact piece N' shifts one after another from 2 to *n*, whereby the switching operation is started and the load $R_L$ is impressed by a voltage higher than the operating reference voltage E of the lower limited voltage switch.

Figure 19:
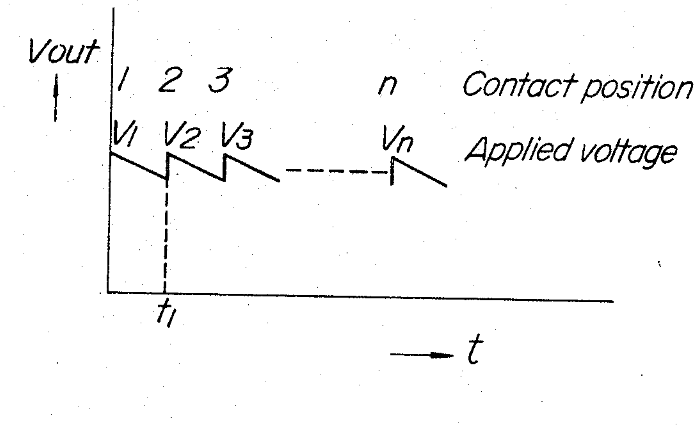
FIG. 19 shows an output characteristic of the device shown in FIG. 18.

The output characteristic obtained by such an automatic voltage switching device is shown in FIG. 19. Said output voltage, namely, the applied voltage on the load $R_L$ may produce variations within a certain range between maximum and minimum. The minimum is the value of the operating reference voltage E of the lower limited voltage switch and the maximum is the value of the reference voltage E added by the battery voltage between the movable contact points and said values are determined by the number of batteries between contact points and the voltages of the batteries. It should, however, be noted that the connecting position of the contact points of the electromagnetic rotary step switch can be replaced by the positive input terminal of said lower limited voltage switch and can be connected to the negative input terminal.

As described, the automatic voltage switching device of this embodiment is, in contrast with that of FIG. 15, more desirably be applied to a particular use. It is peculiar advantageous of this device that the contact points are not electrically closed in circuit such as to cause electrical loss and rectifiers are not required for preventing a counter-electric current.

Futher embodiment will be shown below, in which said upper limited voltage switch and the lower limited voltage switch are applied temperature compensation so that the load circuit may be interrupted upon reaching a fixed reference voltage even when the peripheral temperature would vary.

With respect to the lower limited voltage switch shown in FIGS. 1, 6 and 8 and also to the lower limited voltage switch shown in FIG. 9, the most important factors of temperature dependency are those of $V_{be}$, $\beta$, and $Ico$ of transistor constants and said factors are collectively dealt with as variations of $V_{be}$ of emitter-base voltage of the transistor in the initial stage.

The temperature dependency of a forward voltage of a junction diode is represented by the following formula wherein temperature coefficients are taken as 2.3 mv/° C. for both germanium and silicon diodes:

$$Vbe=\frac{kT}{q}\ln(1-\alpha)$$

Where:
$k$=Boltzmann's constant
T=Absolute temperature
$q$=Electric charge

Figure 21:
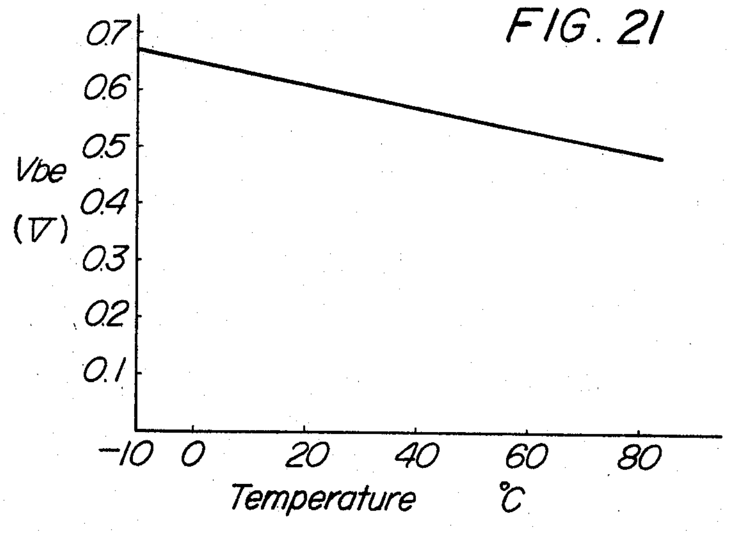
FIG. 21 is a graphical representation of temperature variations of Vbe of pre-stage transistors of the upper limited voltage switch.

The temperature dependency of the transistors is considered quite similar to that of the forward voltage of the junction diode. For example, a graphical representation is given in FIG. 21 with respect to the actual values of a pre-stage transistor used in an embodiment of this invention (FIG. 1). According to this instance, it was found that the value stood at about −2 mv/° C.

In the above upper limited voltage switch and the lower limited voltage switch, the operating condition of the voltage is shown by the formula:

$$V_{be1}=E_{b1}-E_{e1}$$

In order to complete the above formula with respect to the variation of $V_{be1}$ due to temperature change, the right side of the equation can be changed, that is to say, either $E_{b1}$ or $E_{e1}$ may be compensated for the temperature change of $V_{be1}$.

Thus to compensate first $E_{b1}$, the dividing ratio of the resistances $R_1$ and $R_2$ may be made variable in response to the temperature range. This will be accomplished by connection of elements for compensation to the resistances $R_1$ or $R_2$.

In the preceding instance, upon making the temperature compensation by the resistance $R_2$, said resistance $R_2$ must have a positive temperature coefficient and upon making the temperature compensation by the resistance $R_1$, said $R_1$ must have a negative temperature coefficient. Since the resistance element having a negative temperature coefficient such as a thermister can be obtained easily and cheaply compared with that having a positive temperature coefficient, it is more advantageous to use a resistance element such as having a negative temperature coefficient in some portion of the resistance $R_1$.

Figure 20:
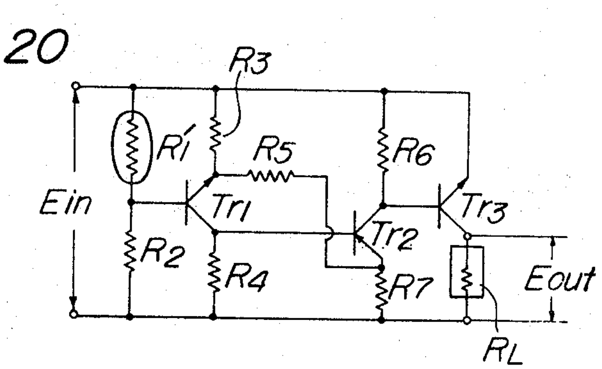
FIG. 20 is a circuit diagram wherein the upper limited voltage switch has been provided with temperature compensation.
Figure 22:
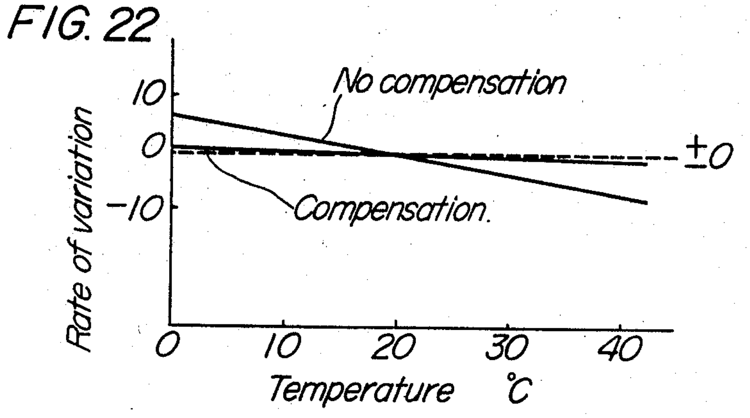
FIG. 22 is a graph showing variations of the operating voltage in response to variation of temperature of the upper limited voltage switch and another switch shown in FIG. 1.

FIG. 20 shows the upper limited voltage switch of FIG. 1 which has been applied the temperature compensation wherein $R_1'$ denotes a resistance element having a negative temperature coefficient as for example a thermister. In comparing the upper limited voltage switch shown in FIG. 20 with the one shown in FIG. 1 with respect to the variation of the operating voltage for the temperature variation, an apparent result has been obtained as in FIG. 22, where, however, the circuit data were rating a 4 v. cutoff, as determined previously in the embodiment of FIG. 1, and the thermister for compensation was computed by experiments.

As shown in the drawings, it may be seen that the variation of the operating voltage generated by changing ±20° C. with respect to normal temperature 20° C., the variation shown in FIG. 1 is ±6~7%, while in FIG. 20 it can be lower than ±1%.

Explaining now about the compensation of $Ee_1$, it will suffice the purpose by changing the dividing ratio of the resistance $R_3$ and the resistances $R_5$ and $R_7$ with respect to the temperature change, so that the resistance element having the negative temperature coefficient can be inserted in place of the resistance $R_5$ similarly as in the previous case.

Figure 23:
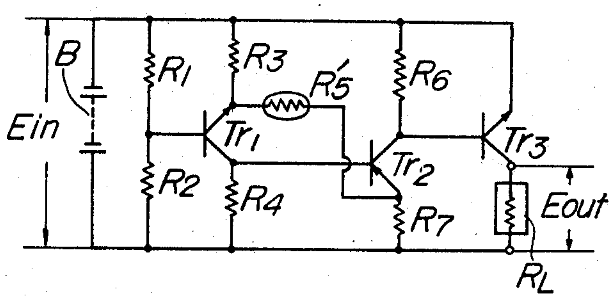
FIG. 23 is a circuit diagram showing another embodiment in which the temperature compensation has been applied to the upper limited voltage switch in FIG. 1.

FIG. 23 shows an example of the present embodiment which has been applied to the upper limited voltage switch of FIG. 1.

The temperature compensation can likewise be applied to the upper limited voltage switch in FIG. 8 and also to the lower limited voltage switch in FIG. 9. The resistance element for compensation may even be singly used for the resistances $R_1$ and $R_5$, or other resistances may be applied in connection in series or in parallel whereby the temperature compensation can be modified as required.

Thus the present invention comprises a signal detection circuit formed by connection of a base of a prestage transistor of a trigger circuit in use of two transistors to the point between input terminals divided by two resistances and a current amplification circuit formed by connection of a collector of a post-stage transistor with a base of the type different from the poststage transistor characterized by the use of, as main constituents, an upper limited voltage switch wherein transistors of different types are employed for said trigger circuit and resistances are inserted between the emitter terminals of two transistors and a lower limited voltage switch employing an ordinary trigger circuit having transistors of the same type in said trigger circuit. It is advantageous of this invention to be able to present a voltage switching device which is less in power loss, highly resistant to wear and oscillation, and deficient in chattering in hysteresis as well as to offer a voltage gate circuit formed by combination of said upper limited voltage switch and the lower limited voltage switch and an automatic voltage switching device in the use of a lower limited voltage switch.

What we claim is:

1. A lower limit voltage switching device for preventing over discharging of a battery comprising a trigger circuit formed by inserting a resistance between the emitter terminals of direct-coupled amplifiers having an NPN transistor in the prestage thereof and a PNP transistor in the post-stage, the input terminal of said switching device, namely the base of the prestage transistor being connected with the mid-point of the divided resistances between the input and a power source, another NPN transistor with the base thereof being connected with the output terminal of said switching device, namely the collector of the post-stage transistor, the emitter thereof with the negative terminal of said power source, the collector thereof with the negative terminal of said switching device, respectively, and a condenser connected between the base of the post-stage transistor and the emitter of the last stage transistor.

2. An automatic voltage switching device comprising an electromagnetic rotary step switch of one circuit multicontact type connected to the output terminal of an upper limit voltage switch including a trigger circuit having two NPN transistors the emitters thereof being coupled to each other, the input of said trigger circuit being connected to the mid point of divided resistances between the positive and the negative terminals of a power source, and a current amplification circuit having a PNP transistor being coupled to the output of said trigger circuit, a fixed terminal of said rotary switch connected to a positive input terminal of said voltage switch, a plurality of movable terminals of said rotary switches respectively connected to the positive electrodes of power source batteries connected in series in a plurality, negative electrodes of a group of power source batteries connected to a negative input terminal of said switch, between which and a fixed terminal of said rotary switch being inserted a load.

3. An automatic voltage switching device as defined in claim 2, wherein the fixed terminal of said rotary switch is connected to the negative terminal of said voltage switch.

4. An automatic voltage switching device comprising an electromagnetic rotary step switch of one circuit multicontact type which is connected to the output terminal of an upper limit voltage switch including an automatic voltage switching device comprising an electromagnetic rotary step switch of one circuit multi-contact type connected to the output terminal of an upper limit voltage switch including a trigger circuit having two PNP transistors the emitters thereof being coupled to each other, the input of said trigger circuit being connected to the mid point of divided resistances being the positive and the negative terminals of a power source, and a current amplification circuit having a NPN transistor being coupled to the output of said trigger circuit, a fixed terminal of said rotary switch connected to a positive input terminal of said voltage switch, a plurality of movable terminals of said rotary switches respectively connected to the positive electrodes of power source batteries connected in series in a plurality, negative electrodes of a group of power source batteries connected in series in a plurality, negative electrodes of a group of power source batteries connected to a negative input terminal of said switch, between which and a fixed terminal of said rotary switch being inserted a load, a fixed terminal of said rotary switch connected to a negative input terminal of said voltage switch, movable terminals of said rotary switch connected respectively to the negative electrodes of power source batteries connected in series in a plurality, positive electrodes of a group of power source batteries connected to a positive electrode of an input terminal of said switch, wherein a load is inserted between said switch and a fixed terminal of said rotary switch.

5. An automatic voltage switching device as defined in claim 4, wherein the fixed terminal of said rotary switch is connected to the positive input terminal of said voltage switch.

References Cited

UNITED STATES PATENTS

| | | | |
|---|---|---|---|
| 2,751,549 | 6/1956 | Chase | 307—313 |
| 2,808,471 | 10/1957 | Poucel | 307—297 |
| 3,076,135 | 1/1963 | Farnsworth | 307—313 |
| 3,083,330 | 3/1963 | Roth | 307—313 |
| 3,185,856 | 5/1965 | Harrison | 307—297 |
| 3,360,920 | 7/1966 | Shoemaker | 307—297 |
| 3,300,689 | 1/1967 | Beddoes | 317—31 |
| 3,302,062 | 1/1967 | Craig | 307—297 |
| 2,832,900 | 4/1958 | Ford | 307—313 |
| 3,096,487 | 7/1963 | Lee | 307—313 |
| 3,202,969 | 8/1965 | Eady | 307—235 |
| 3,280,261 | 10/1966 | Korn | 307—235 |
| 3,306,030 | 2/1967 | Wiley | 307—313 |
| 3,317,753 | 5/1967 | Mayhew | 307—235 |
| 3,354,399 | 11/1967 | Houpt et al. | 307—235 |
| 3,355,632 | 11/1967 | Wallentowitz | 307—313 |
| 3,341,748 | 9/1967 | Kammiller | 307—288 |

DONALD D. FORRER, Primary Examiner

H. A. DIXON, Assistant Examiner

U.S. Cl. X.R.

307—235; 317—33